United States Patent [19]

Tartaglia et al.

[11] Patent Number: 5,078,177
[45] Date of Patent: Jan. 7, 1992

[54] POP-TYPE RELIEF-VALVE CONSTRUCTION

[75] Inventors: Peter A. Tartaglia, Butler; Donald A. Worden, Pompton Plains, both of N.J.

[73] Assignee: Marotta Scientific Controls, Inc., Montville, N.J.

[21] Appl. No.: 518,021

[22] Filed: May 2, 1990

[51] Int. Cl.⁵ ............................................. F16K 17/06
[52] U.S. Cl. .................................................... 137/471
[58] Field of Search .............................. 137/471, 484.2

[56] References Cited

U.S. PATENT DOCUMENTS

| 961,735 | 6/1910 | Schutte | 137/471 |
| 2,069,522 | 2/1937 | Flournoy | 137/471 |
| 3,080,885 | 3/1963 | Webster et al. | 137/471 |

FOREIGN PATENT DOCUMENTS 63490 9/1891 Fed. Rep. of Germany ...... 137/471

*Primary Examiner*—Stephen M. Hepperle
*Attorney, Agent, or Firm*—Hopgood, Calimafde, Kalil, Blaustein & Judlowe

[57] ABSTRACT

The invention contemplates an improved poppet-type relief-valve construction which features an inlet-port configuration at upstream offset from the valve-closed seat region of the valve. To open the valve, a valve member must be moved by upstream pressure exceeding a predetermined threshold. This valve member integrally carries a specially profiled formation that (a) is upstream from the seat region and (b) coacts with a specially profiled region of inlet port. This action necessarily takes place upstream from the seat region and is such as to provide control of valve operation especially during that fraction of valve-member displacement that spans the "cracking" phase of valve operation. The net result is to avoid development of the "chatter" which customarily characterizes the "cracking" phase of valve operation.

12 Claims, 3 Drawing Sheets

POP-TYPE RELIEF-VALVE CONSTRUCTION

BACKGROUND OF THE INVENTION

The invention relates to a relief-valve construction, wherein a sensed threshold of pressure of a pressure fluid is operative to open the valve and thereby vent the pressure fluid.

Conventional practice in relief-valve construction is to provide a valve member on the downstream side of its seat, the valve member being spring-biased to its seating position of valve closure. Pressure acting on the valve member must exceed the spring bias if the valve is to be cracked, for a venting flow of fluid under pressure. But once cracked at onset of a relieving flow, the pressure and fluid density conditions determining whether and to what extent the valve is to open can be almost anything, being on the downstream side of the seat, and therefore subject to fluctuating pressure differentials on the downstream side of the seat. Relief-valve operation therefore can be spasmodic, manifesting itself in chatter.

BRIEF DISCUSSION OF THE INVENTION

It is an object of the invention to provide an improved relief-valve construction of the character indicated.

A specific object is to provide smooth operation in a relief valve of the character indicated.

Another specific object is to provide a relief valve construction in which there is a significant degree of upstream-pressure involvement in control of the valve-member position; stated in other words, it is an object of the invention to provide a relief-valve construction wherein pressure and/or density variations on the downstream side of the seat have little or no effect on valve operation.

Still another specific object is to meet the above objects with a construction which lends itself to the handling of liquid or gaseous pressure fluids, and which is readily adapted to handling relief of a relatively low threshold pressure as well as to the relief of relatively great threshold pressure.

A general object is to meet the above objects with a basically simple and therefore inexpensive construction, having features of adjustability and adaptability to different fluids, and to a variety of fluid-pressure and fluid-flow requirements.

The invention meets these objects in a relief-valve construction in which the inlet port to the valve comprises an axially extending diffuser profile concentric with a central axis of guided valve-member displaceability and culminating at or near the seat opening through which a relieving discharge is to flow. The valve member, which has a valve-closure land and is preloaded for a normal position of valve-closure coaction with the seat opening, is further characterized with an integrally formed profile which extends upstream of the valve-seat opening, for coaction with a throat region of the diffuser profile, the coaction being to define a flow restriction upstream from the seat unless and until the valve has at least begun to crack open, in response to upstream pressure exceeding threshold. Once the valve has cracked open, and depending upon the design pressure threshold and flow capacity of the valve, coacting contours of the diffuser and of the valve member, determine a progressive opening of the upstream restriction; concurrently the upstream profile of the valve member (i.e., profile upstream from the valve-closure land) coacts with the seat opening to determine progressive enlargement of an annular section of discharge-flow accommodation.

BRIEF DESCRIPTION OF THE DRAWINGS

The invention will be described in detail for a preferred embodiment, in conjunction with the accompanying drawings, in which.

DETAILED DESCRIPTION

Figure 2:
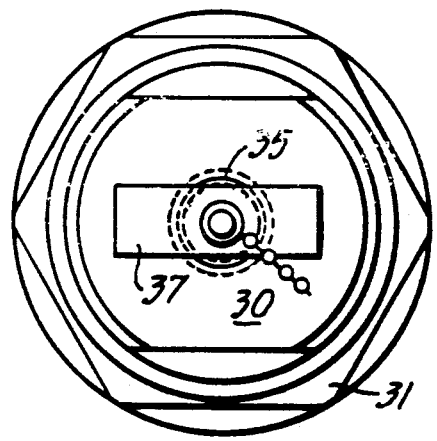
FIG. 2 is an upper end view of the valve of FIG. 1.
Figure 1:
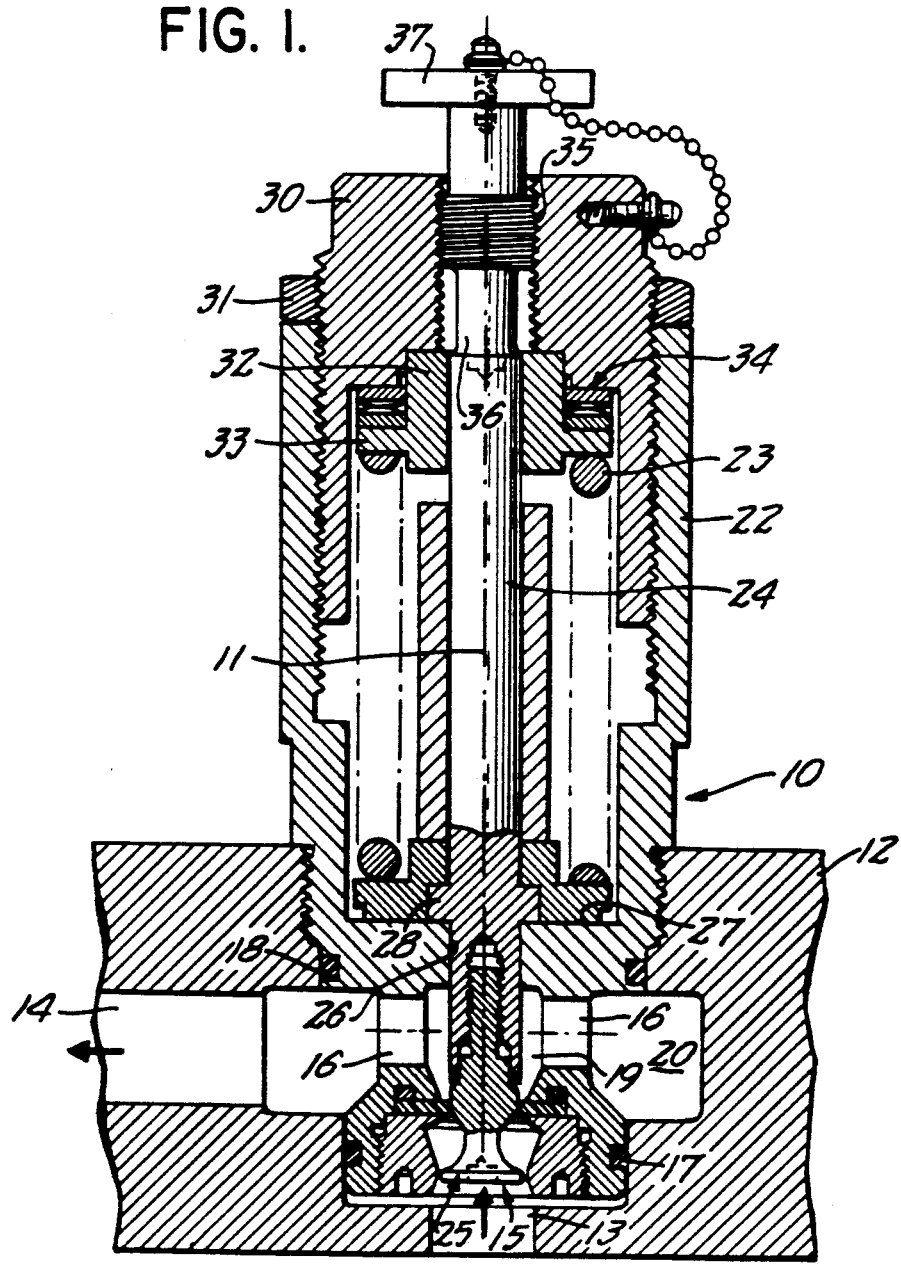
FIG. 1 is a view in longitudinal section of a relief valve of the invention, shown in closed condition and mounted to a fragment of other structure to provide inlet and outlet flow accommodation for the valve.

The valve of FIG. 1 is seen to comprise a body 10 having threaded fit about a central axis 11 to structure 12 which provides inlet-flow and outlet-flow accommodation at 13-14 to inlet-port and outlet-port formations 15-16 of the valve. Elastomeric 0-ring seals at 17-18 located in grooves of body 10 assure circumferentially sealed engagement to bore and counterbore regions of the structure 12 whereby any flow through the valve is via inlet port 15, to a chamber region 19 of the body, and with discharge to passage 14 via multiple ports 16 to an annular manifold 20 that is defined by and between body 10 and structure 12.

The valve body 10 is shown with upstanding tubular housing structure 22 for containment of a coil spring 23 for preloading an elongate valve stem 24 which carries a valve member 25 at its lower end. Stem 24 is guided in a bore 26 of body 10, concentric with axis 11 and extending from chamber 19 to a flat radial abutment surface 27 for location of a shoulder or flange portion 28 of stem 24, when the valve is in the closed position shown in FIG. 1. The shoulder portion 28 also provides thrust-transmitting reference for an annular thrust plate or ring 29 which seats and locates the lower end of spring 23.

Provision is made for selective adjustment of downwardly directed preload force exerted by spring 23 on stem 24, via plate 29 and shoulder 28. As shown, an annular adjustment member 30 has threaded engagement to the counterbored upper end of the housing structure 22, and a lock nut 31 secures a given preloading adjustment of the threaded positioning of member 30 in structure 22. More specifically, a guide bushing 32 locates in a counterbore of member 30 and provides upper-end guidance for the valve stem 24; bushing 32 also includes a seating flange 33 for engaging and locating the upper end of spring 23 and for receiving adjusted preload force reaction via antifriction thrust-bearing means 34 which is received at the flat upper end wall of another counterbore in member 30. Running axial and radial clearance at the upper end of bushing 32 enables smoothly adjusted transmission of compression force on spring 23 solely via the thrust-bearing means 34, which is recommended for high pressure applications, although an antifriction bearing at 34 is not needed for relief of relatively low pressures.

The upper end of the preload-adjustment member 30 is shown with a bore that is threaded for selective reception of a so-called gag screw 35 having a lower stem portion 36 to engage valve stem 24 and an upper-stem connection to a rotary-drive handle or wing member 37. The gag means 35-36-37 serves to lock the valve stem 24 in its fully seated position, rendering the valve inoperable unless the gag setting has been backed off from engagement with the valve stem. A loose bead-chain connection is shown from handle 37 to member 30, so as to avoid loss of the gag means when totally removed from its threaded engagement.

Figure 3:
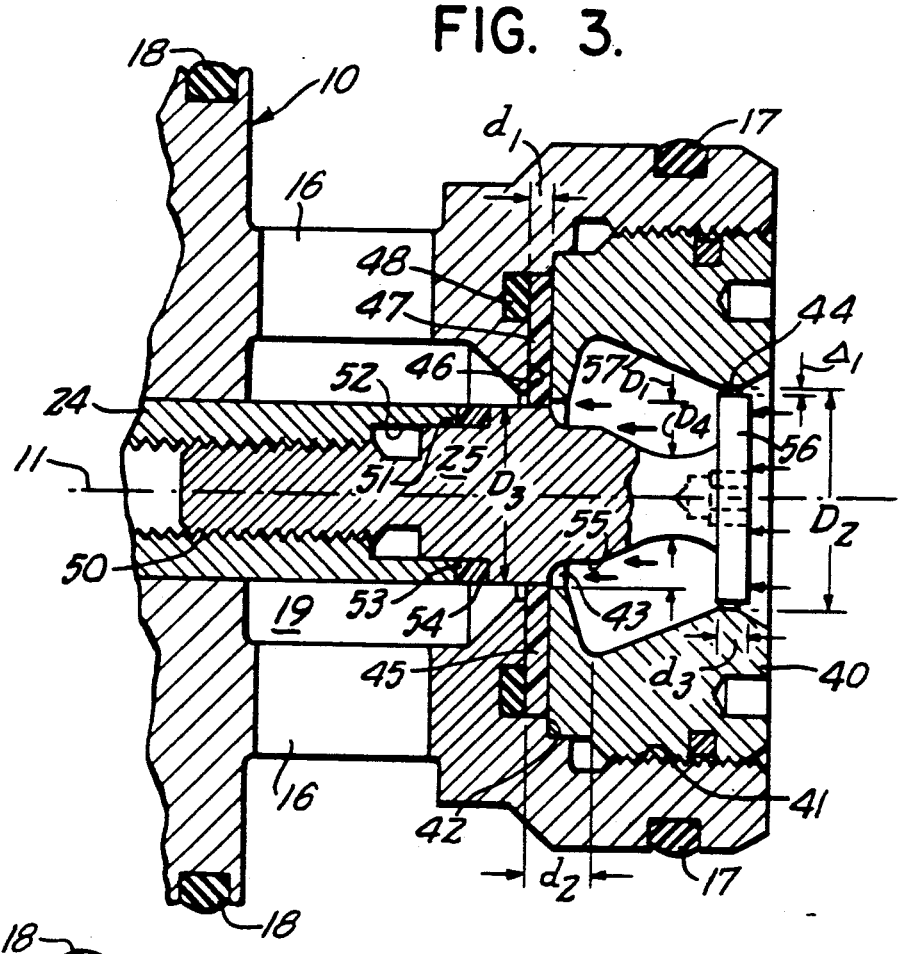
FIGS. 3 and 4 are like views of an enlarged fragmentary section of the valve of FIG. 1, in the region of fluid-pressure response and flow, and respectively showing the relation of parts in the closed condition and in the open condition of the valve.
Figure 4:
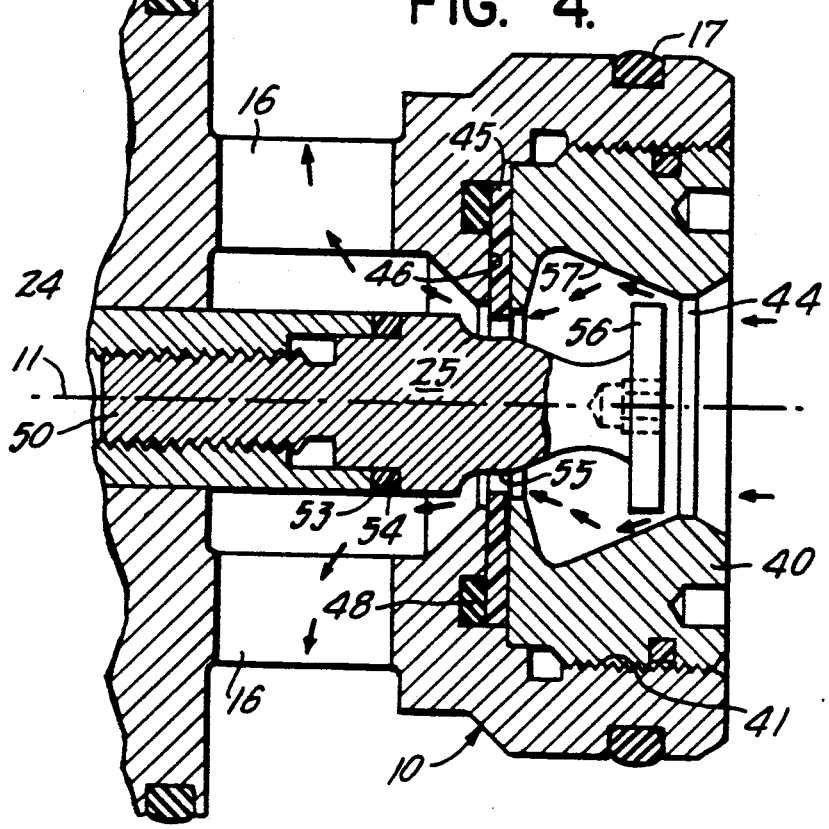

Reference is now made to FIGS. 3 and 4 for more detailed consideration of the valve member 25 and its relation to inlet-port formations 15, which formations are seen to be determined by an insert 40 having threaded reception in a counterbore 41 to a seating limit at a shoulder 42 of the counterbore. The insert 40 has a specially characterized bore which extends from a cylindrical seat opening 43 of first diameter $D_1$ and in the upstream direction to a second and larger diameter $D_2$ at the throat 44 of a diffuser or nozzle profile; and the diffuser or nozzle profile extends for the major fraction of the total axial dimension of insert 40. The axially inner end wall 45 of insert 40 is flat and normal to axis 11, and shoulder 42 positions wall 45 of the insert to a predetermined distance $d_1$ from and parallel to a recessed wall formation 46 of body 10, such that an elastomeric disc 47 of thickness slightly less than but no greater than $d_1$ can be precisely located therein, under residual resilient peripheral clamping and sealing action of an elastomeric 0-ring 48. The outer diameter of disc is radially located by a cylindrical wall in common with the locating groove for 0-ring 48, and the unstressed bore diameter is with wiping contact to the local valve-closing land diameter $D_3$ of valve member 25. As clearly seen in FIG. 3, diameter $D_3$ is slightly less $D_1$, and the valve member 25 substantially fully laps the bore of disc 47 when in the valve-closed condition shown; the result is to provide for a pretravel of substantially the distance $d_1$ before rising pressure at the inlet can be effective to crack the valve-closed condition shown in FIG. 3.

The valve member 25 is preferably a replaceable attachment at the upstream end of valve stem 24. To this end, member 25 has a threaded tail 50 removably engaged to a threaded bore in the valve stem; a cylindrical land portion 51 of member 25 has concentrically piloted support in a guiding counterbore 52 in the stem, and a spacer shim 53 is assembled between the stem end and a shoulder 54 of the valve member. The selection of shim thickness at 53 will be understood to determine valve-member lap and therefore pretravel of the valve member to the point of initially "cracking" the valve opening.

Valve-member coaction with the valve opening established by the bore of disc 47 is determined by a first profiling of the valve member, over the axial distance $d_2$. Starting with the valve-closed condition of FIG. 3, this profiling is cylindrical and of diameter $D_3$, for the length of pretravel; and a curvilinear reducing profile 55 gradually increases the sectional area of the cracked opening to a maximum opening, over the travel distance needed for a full opening of the valve. The remaining contouring of valve member 25 involves further and gradual reduction in valve-member diameter, to a minimum $D_4$, at short offset from an enlarged head 56, which provides a cylindrical land in lapping and close-clearance ($\Delta_1$) relation with the diffuser throat 44 when the valve is in the closed condition of FIG. 3.

Preferably, and in the valve-closed condition, the lap $d_3$ of valve-member head 56 with the diffuser throat 44 exceeds the lap $d_1$ of the valve-member land with the bore of the elastomeric disc 47; this will be understood to be a means of utilizing the throat 44 as a restrictor of fluid flow until the valve opening (determined by valve-member profile 55) is safely beyond the "cracking" phase of valve opening, thus avoiding chatter and excessive wear of the bore of disc 47 under valve-cracking conditions. However, once the valve-opening displacement of valve member 25 has advanced safely beyond "cracking", the head 56 enters the generally conical expansion region 57 of the diffuser profile, and the widening clearance between head 56 and region 57 reduces gradually to having virtually zero limitation on flow through the valve, when the valve member 25 is at its full-open position.

A preference is noted that the 0-ring seals 17-18-48 shall be of elastomeric fluorocarbon material and that the disc shall be substantially compounded of Teflon*, to a durometer so related to design pressure conditions as to enable fluid pressure at the inlet port to establish disc 47 as a "squeeze seat", in that such inlet pressure (denoted by arrows in the left direction of FIG. 3, and within the open annular volume defined by and between the special profiles of the bore of insert 40 and the reduced region of valve member 25) is operative to radially inwardly deform disc 47 into tightly sealing relation with the valve-member land. When increasing fluid pressure at the inlet port is sufficient to overcome the preload setting of spring 23, the pretravel of the valve member proceeds with the valve fully sealed and closed by the squeeze of disc 47, until the valve begins to crack open. At this juncture, the valve-member head 56 still offers a restrictive relation with throat 44, thus avoiding a chattering oscillation of flow rate at the "cracked" opening. And for fluid pressures sufficiently above threshold to drive the valve member to full-open condition, the expanding clearance between head 56 and the diffuser profile 57 continues to provide a smooth regulating control which mitigates against chatter, whatever the maximum flow.

*The trademark of the DuPont company for its tetrafluoroethylene material.

The described invention will be seen to achieve all stated objectives. The valve-closing (seating) area of the poppet valve member is preferably finished to a sixteen or better extent to insure a positive leak-tight seal when the valve is closed, with inlet pressure contributing a squeeze of the sealed relation. Once the valve "cracks" open and is flowing, the position of the valve member is controlled by differential pressure across the face of the poppet; and as flow increases, this differential pressure pushes the poppet open, all subject to the regulating effect which is proportional inter alia to the instantaneous clearance between head 56 and the diffuser profile 57, thus assuring that pressure drop across the poppet shall be kept to a minimum. Unlike conventional poppet-type relief valves, control of the described valve is always upstream from the "seat" region of disc 47, and this control is always sufficiently at upstream offset from the "seat" region so that very little variation is encountered in the line fluid. When inlet pressure decreases, the pressure differential across the face of the poppet decreases and the valve closes.

Figure 5:
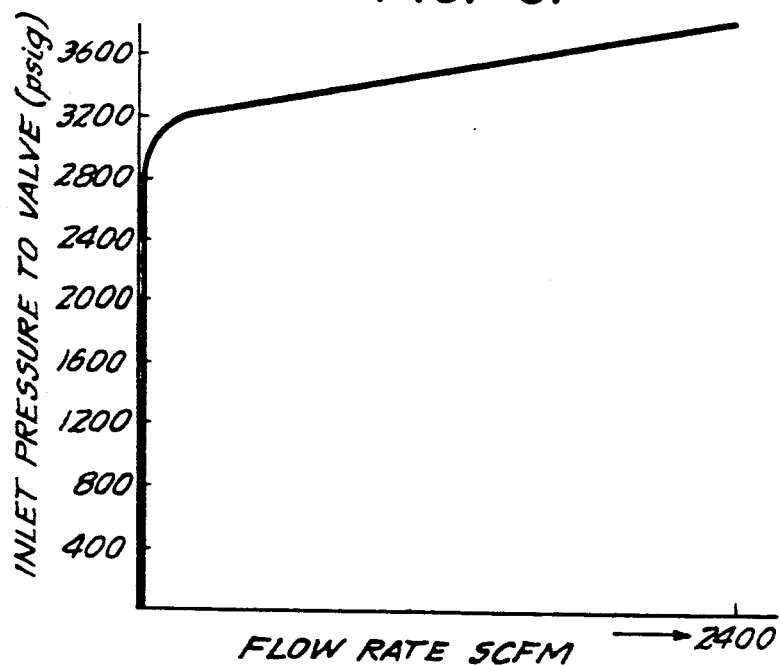
FIGS. 5 and 6 are similar graphs in illustration of different operations of the valve of FIG. 1.

Preliminary testing to date shows that the cracking-to-reseat pressure relationship is excellent. The valve operates smoothly and without the chatter commonly associated with poppet-type valves. And FIG. 5 is a graph to illustrate operation of the described valve, having a central opening $D_1$ of one half inch and valve-member displacement of 0.070 inch pretravel, from 0 psig to 3300 psig "cracking" pressure, followed by an additional travel displacement of 0.060 inch, from 3300 psig to 3550 psig at the full flow condition (2000 SCFM), involving nitrogen as the flowing pressure fluid. The graph of FIG. 5, is a plot of measured flow (SCFM) against inlet pressure, exhibiting near-perfect tracking (i.e., very little hysteresis) over the course of rise in pressure, for the range from zero to 3600 psig, and return therefrom, back to zero psig.

Figure 6:
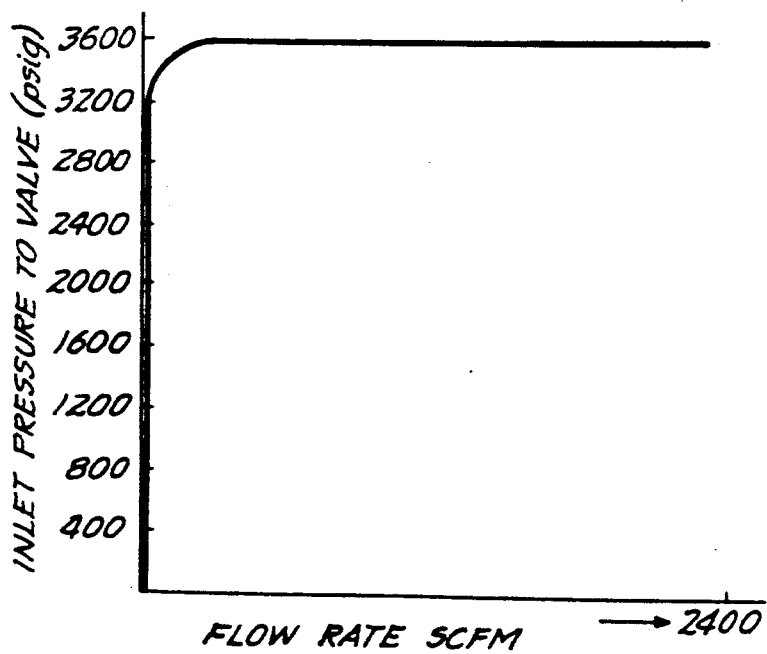

FIG. 6 illustrates similar fidelity to a slightly different characteristic, wherein the valve is used as a back-pressure regulator, at virtually constant pressure, over almost the entire range of measured flow. The only structural difference, accounting for the respective curves FIGS. 5 and 6, is the degree to which valve member 25 is positioned with respect to the stem 24, as by selective use of a different-size spacer shim at 53.

The described valve construction will be appreciated as having utility and application in ranges and for fluids other than those which have been specifically mentioned. The coacting profiles of the valve member and the insert bore with which it cooperates may be specially configured for its intended pressure threshold of valve cracking and for the fluid to be relieved. For example, in addition to special profiling of surfaces coacting upstream from the locale of valve cracking, the choice of shim thickness at 53 is selectively available to determine the timing of upstream control in relation to valve cracking. And for pressure thresholds at lesser levels, it is clear that a simple low-friction washer or the like may obviate the need for an antifriction bearing in the preload adjustment componentry of the valve.

What is claimed is:

1. A pop-type relief valve, comprising a valve body having a central axis, an inlet port having an upstream diffuser portion and a valve opening communicating with a valve chamber on the downstream side of the valve opening, and an outlet port communicating with said valve chamber, said diffuser portion and said valve opening having circumferential symmetry about said axis, said body having a guide bore on said axis and terminating in an abutment surface external of said chamber, a valve member including a stem guided by said bore and positioning said valve member within said diffuser portion and with respect to said valve opening, a stop shoulder on said stem, and preloading means carried by said body and urging said stem into a normal position of shoulder abutment with said abutment surface; said valve member having a first circular contour closing said valve opening when in said normal position; said valve member and said diffuser portion having, upstream from said valve opening, a first region of coacting contours defining an annular flow constriction of least sectional area when in said normal position; said valve member and said diffuser portion having an axially extending second region of coacting concentric contours which, after cracking the valve opening, substantially reduce inlet-flow constriction thereby substantially increasing the sectional area of inlet-flow passage in the course of valve-opening displacement of said valve member; and the contour of said valve member in said second region being of reducing diametral extent in the direction upstream from said first circular contour.

2. The relief valve of claim 1, wherein said valve opening is defined by a cylindrical bore concentric with said axis, and wherein the first circular contour of said valve member is a cylindrical land that is in at least partially lapped relation with the cylindrical bore of said valve opening when in said normal position.

3. A pop-type relief valve, comprising a valve body having a central axis, an inlet port having an upstream diffuser portion and a valve opening defined by a cylindrical bore concentric with said axis and communicating with a valve chamber on the downstream side of the valve opening, and an outlet port communicating with said valve chamber, said diffuser portion and said valve opening having circumferential symmetry about said axis, said body having a guide bore on said axis and terminating in an abutment surface external of said chamber, a valve member including a stem guided by said bore and positioning said valve member within said diffuser portion and with respect to said valve opening, a stop shoulder on said stem, and preloading means carried by said body and urging said stem into a normal position of shoulder abutment with said abutment surface; said valve member having a first circular contour in the form of a cylindrical land that is in at least partially lapped relation with said cylindrical bore to close said valve opening when in said normal position; said valve member and said diffuser portion having, upstream from said valve opening, a first region of coacting contours defining an annular flow constriction upstream from said valve opening when in said normal position; said valve member and said diffuser portion having an axially extending second region of coacting concentric contours which substantially reduce inlet-flow constriction upstream from said valve opening after cracking the valve opening; the contour of said valve member in said second region being of reducing diametral extent in the direction upstream from said first circular contour; the cylindrical bore of said valve opening being defined by the bore of an annular disc of elastomeric material, said disc being retained by said body in concentric relation with said axis, and the bore of said disc having wiping contact with said land when in said normal position.

4. The relief valve of claim 3, in which said elastomeric material is tetrafluoroethylene.

5. A pop-type relief valve, comprising a valve body having a central axis, an inlet port having an upstream diffuser portion and a valve opening communicating with a valve chamber on the downstream side of the valve opening, and an outlet port communicating with said valve chamber, said diffuser portion and said valve opening having circumferential symmetry about said axis, said body having a guide bore on said axis and terminating in an abutment surface external of said chamber, a valve member including a stem guided by said bore and positioning said valve member within said diffuser portion and with respect to said valve opening, a stop shoulder on said stem, and preloading means carried by said body and urging said stem into a normal position of shoulder abutment with said abutment surface; said valve member having a first circular contour closing said valve opening when in said normal position; said valve member and said diffuser portion having, upstream from said valve opening, a first region of coacting contours defining an annular flow constriction upstream from said valve opening when in said normal position; said valve member and said diffuser portion having an axially extending second region of coacting concentric contours which substantially reduce inlet-flow constriction upstream from said valve opening after cracking the valve opening; the contour of said valve member in said second region being of reducing diametral extent in the direction upstream from said first circular contour; said valve member having threaded connection to said valve stem, and the upstream end of said valve member being externally exposed for access to adjust the extent to which threaded advance is made at said connection.

6. The relief valve of claim 5, in which said threaded connection includes means effectively locking a given adjustment of said threaded advance.

7. A pop-type relief valve, comprising a valve body having a central axis, an inlet port having an upstream diffuser portion and a valve opening communicating with a valve chamber on the downstream side of the a valve opening, and an outlet port communicating with said valve chamber, said diffuser portion and said valve opening having circumferential symmetry about said axis, said body having a guide bore on said axis and terminating in an abutment surface external of said chamber, a valve member including a stem guided by said bore and positioning said valve member within said diffuser portion and with respect to said valve opening, a stop shoulder on said stem, and preloading means carried by said body and urging said stem into a normal position of shoulder abutment with said abutment surface; said valve member having a first circular contour closing said valve opening when in said normal position; said valve member and said diffuser portion having, upstream form said valve opening, a first region of coacting axially extending contours defining an annular flow constriction upstream from said valve opening when in said normal position; said valve member and said diffuser portion having an axially extending second region of coacting concentric contours which substantially reduce inlet-flow constriction upstream from said valve opening after cracking the valve opening; the contour of said valve member in said second region being of reducing diametral extent in the direction upstream from said first circular contour; and said diffuser portion being defined by the axially extending bore of an annular insert member, removably mounted to said body in concentric relation to said axis.

8. The relief valve of claim 3, in which said upstream diffuser portion is defined by the bore of an annular insert member, removably mounted to said body in concentric relation to said axis, said insert compressionally engaging and clamping said disc to said body.

9. The relief valve of claim 1, in which said preloading means is a compression spring, and means to selectively adjust the preloading compressional force of said spring.

10. The relief valve of claim 9, in which said body is integrally formed with a housing portion encasing said spring, said selectively adjustable means having threaded reference to said housing portion.

11. The relief valve of claim 1, in which the upstream end of said valve member is characterized by a maximum diameter exceeding that of said first circular contour, said maximum diameter coacting with the adjacent profile of said diffuser portion to define said flow constriction, and the profile of said valve member between said maximum diameter and said first circular contour being a concave curvilinear surface of revolution having a minimum diameter less than that of said first circular contour.

12. The relief valve of claim 1, in which said diffuser portion is characterized by a bore which is a convex curvilinear surface of revolution having a reduced throat which coacts with the adjacent contour of said valve member to define said flow restriction.

* * * * *